May 18, 1926. 1,585,627
D. O'BRIEN
LOCK NUT
Filed July 6, 1925
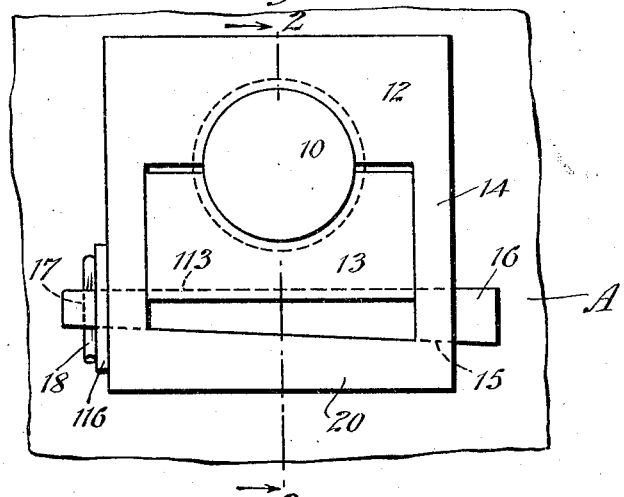
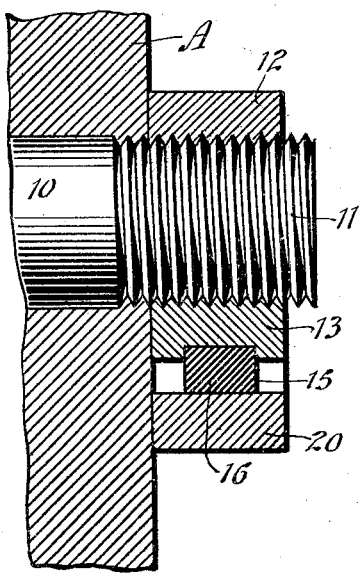
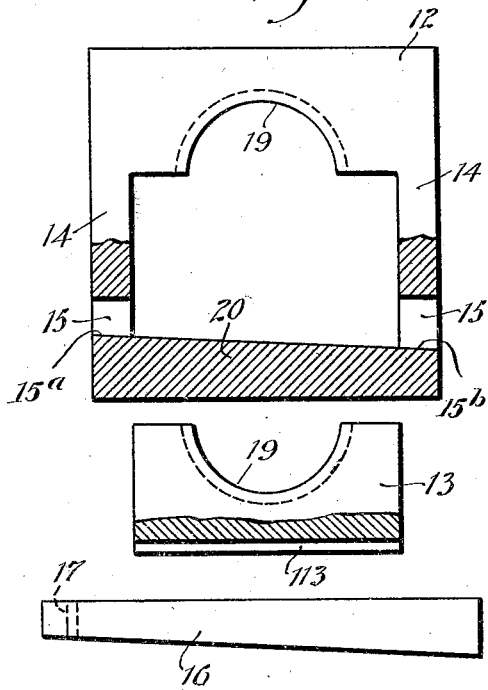
WITNESSES
INVENTOR
Daniel O'Brien
BY
ATTORNEYS Patented May 18, 1926.

1,585,627

UNITED STATES PATENT OFFICE.

DANIEL O'BRIEN, OF PALESTINE, TEXAS.

LOCK NUT.

Application filed July 6, 1925. Serial No. 41,740.

My invention relates to lock nuts to be applied to ordinary bolts for holding the nut immovable.

The prime object of my invention is to provide a lock nut made in sections after the manner of a split nut, the one section having arms between which the other section is received, together with wedge means to tightly bind the sections on the bolt in a manner to prevent the displacement of the nut or a relative displacement of the nut sections.

The present invention is designed more particularly as an improvement on the lock nut forming the subject-matter of United States Patent Number 1,530,396, granted to me March 17, 1925.

The particular object of the present invention is to improve the patented nut lock referred to especially with respect to strengthening that split nut section having the arms as well as to provide for a more effective interengagement and locking of the parts.

Reference is to be had to the accompanying drawings forming a part of this specification, it being understood that the drawings are merely illustrative of one example of the invention.

Figure 1 is a front view of a lock nut embodying my invention, showing the same applied;

Figure 2 is a section on the line 2—2, Figure 1;

Figure 3 is a partly sectional front view of the separated elements of my improved lock nut.

My improved lock nut is applicable to the threads 11 of any ordinary bolt 10 for uniting two parts, a fragment of one of which is indicated at A.

The nut is given the general form of a split nut being composed of complementary sections 12, 13 adapted to meet at the median line of the nut. The one section as 12 is formed with parallel side arms 14 between which the other nut section 13 is snugly received. The said arms 14 are formed with holes 15 adapted to receive a key 16. The corresponding walls or sides 15ª, 15ᵇ, of the holes 15 are preferably in the same inclined plane to conform to the inclined side of the key which is wedge-shaped, the opposite side of the wedge or that side bearing against the nut section 13 being parallel with the adjacent side of said nut section to give a firm bearing against the latter. The key may be formed with a hole 17 to receive a cotter pin 18. The numeral 116 represents a washer on key 16.

With the nut section placed on the bolt and the key 16 driven home, it will be obvious that the nut sections firmly bind against the bolt to prevent a relative turning of the nut and bolt.

The numeral 19 indicates the semi-circular threaded recesses of the respective sections of the split nut.

In accordance with the present invention, the arms 14 at the free ends thereof are united by an integral cross bar or girt 20 adjacent to which the holes 15 are formed. Also, in the present invention the split nut sections 13 at the back thereof is formed with a longitudinal groove 113 which partially receives the key 16, so that the key and said nut section interlock. The construction results in increased strength and results in a more effective holding of the parts.

I would state, furthermore, that while the illustrated example constitutes a practical embodiment of my invention, I do not limit myself strictly to the exact details herein illustrated, since, manifestly, the same can be considerably varied without departure from the spirit of the invention as defined in the appended claims. For example, it will be evident that other means than cotter pin 18 may be employed to fasten key 16.

Having thus described my invention, I claim:

1. A lock nut formed in two sections to constitute it a split nut, one of the sections having arms between which the other section of a nut is received, a cross bar integral with the arms and uniting the same at the free ends thereof, said arms having holes therein between the second nut section and the said cross bar, and a wedge key receivable in said holes and adapted to bind the nut sections firmly on a bolt.

2. A lock nut formed in two sections to constitute it a split nut, one of the sections having arms between which the other section of a nut is received, a cross bar integral with the arms and uniting the same at the free ends thereof, said arms having holes therein between the second nut section and the said cross bar, and a wedge key receivable in said holes and adapted to bind the nut sections firmly on a bolt, said second-mentioned section having a longitudinal groove in the back thereof partially receiving the said key.

DANIEL O'BRIEN.